(12) United States Patent  (10) Patent No.: US 9,129,219 B1
Robertson et al.  (45) Date of Patent: Sep. 8, 2015

(54) CRIME RISK FORECASTING

(71) Applicant: Palantir Technologies, Inc., Palo Alto, CA (US)

(72) Inventors: Duncan Robertson, Sutton Scotney (GB); Alexander Sparrow, Bath (GB); Mike Lewin, London (GB); Meline Von Brentano, London (GB); Matthew Elkherj, Palo Alto, CA (US); Rafael Cosman, La Jolla, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/319,161

(22) Filed: Jun. 30, 2014

(51) Int. Cl.
*G06N 5/04* (2006.01)
*G06N 99/00* (2010.01)

(52) U.S. Cl.
CPC .............. *G06N 5/048* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 4,899,161 A | 2/1990 | Morin et al. | |
| 4,958,305 A | 9/1990 | Piazza | |
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 5,818,737 A * | 10/1998 | Orr et al. ........................... | 703/6 |
| 6,091,956 A | 7/2000 | Hollenberg | |
| 6,157,747 A | 12/2000 | Szeliski et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,978,419 B1 | 12/2005 | Kantrowitz | |
| 6,985,950 B1 | 1/2006 | Hanson et al. | |

(Continued)

FOREIGN PATENT DOCUMENTS

| | | |
|---|---|---|
| CN | 102054015 | 5/2014 |
| DE | 102014204827 | 9/2014 |

(Continued)

OTHER PUBLICATIONS

Azavea Journal, HunchLab: Heat Map and Kernel Density Calculation for Crime Analysis, 2009.*

(Continued)

*Primary Examiner* — Jeffrey A Gaffin
*Assistant Examiner* — Mikayla Chubb
(74) *Attorney, Agent, or Firm* — Hickman Palermo Becker Bingham LLP; Adam C. Stone

(57) ABSTRACT

A computer-based crime risk forecasting system and corresponding method are provided for generating crime risk forecasts and conveying the forecasts to a user. With the conveyed forecasts, the user can more effectively gauge both the level of increased crime threat and its potential duration. The user can then leverage the information conveyed by the forecasts to take a more proactive approach to law enforcement in the affected areas during the period of increased crime threat.

20 Claims, 5 Drawing Sheets

(56) References Cited

U.S. PATENT DOCUMENTS

| | | |
|---|---|---|
| 7,036,085 B2 | 4/2006 | Barros |
| 7,158,878 B2 | 1/2007 | Rasmussen et al. |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,232 B2 | 11/2009 | Gabbert et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,941,321 B2 | 5/2011 | Greenstein et al. |
| 7,945,852 B1 | 5/2011 | Pilskalns |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,214,361 B1 | 7/2012 | Sandler et al. |
| 8,214,764 B2 | 7/2012 | Gemmell et al. |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,301,464 B1 | 10/2012 | Cave et al. |
| 8,302,855 B2 | 11/2012 | Ma et al. |
| 8,325,178 B1 | 12/2012 | Doyle, Jr. |
| 8,332,354 B1 | 12/2012 | Chatterjee et al. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,589,273 B2 | 11/2013 | Creeden et al. |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 * | 2/2015 | Mohler .......................... 706/46 |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0147805 A1 | 10/2002 | Leshem et al. |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0034570 A1 | 2/2004 | Davis |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2004/0153418 A1 | 8/2004 | Hanweck |
| 2005/0010472 A1 | 1/2005 | Quatse et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0086207 A1 | 4/2005 | Heuer et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0139375 A1 | 6/2006 | Rasmussen et al. |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0241974 A1 | 10/2006 | Chao et al. |
| 2006/0251307 A1 | 11/2006 | Florin et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0284433 A1 | 12/2007 | Domenica et al. |
| 2007/0294643 A1 | 12/2007 | Kyle |
| 2008/0010605 A1 | 1/2008 | Frank |
| 2008/0034327 A1 | 2/2008 | Cisler et al. |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0106178 A1 | 4/2009 | Chu |

(56) References Cited

U.S. PATENT DOCUMENTS

| | | | |
|---|---|---|---|
| 2009/0112745 A1 | 4/2009 | Stefanescu | |
| 2009/0115786 A1 | 5/2009 | Shimasaki et al. | |
| 2009/0125459 A1 | 5/2009 | Norton et al. | |
| 2009/0132921 A1 | 5/2009 | Hwangbo et al. | |
| 2009/0132953 A1 | 5/2009 | Reed et al. | |
| 2009/0144262 A1 | 6/2009 | White et al. | |
| 2009/0158185 A1 | 6/2009 | Lacevic et al. | |
| 2009/0171939 A1 | 7/2009 | Athsani et al. | |
| 2009/0172511 A1 | 7/2009 | Decherd et al. | |
| 2009/0179892 A1 | 7/2009 | Tsuda et al. | |
| 2009/0187546 A1 | 7/2009 | Whyte et al. | |
| 2009/0187548 A1 | 7/2009 | Ji et al. | |
| 2009/0198641 A1* | 8/2009 | Tortoriello | 706/52 |
| 2009/0222400 A1 | 9/2009 | Kupershmidt et al. | |
| 2009/0249244 A1 | 10/2009 | Robinson et al. | |
| 2009/0271343 A1 | 10/2009 | Vaiciulis et al. | |
| 2009/0292626 A1 | 11/2009 | Oxford | |
| 2009/0313463 A1 | 12/2009 | Pang et al. | |
| 2009/0319295 A1* | 12/2009 | Kass-Hout et al. | 705/2 |
| 2009/0319418 A1 | 12/2009 | Herz | |
| 2010/0042922 A1 | 2/2010 | Bradateanu et al. | |
| 2010/0057622 A1 | 3/2010 | Faith et al. | |
| 2010/0057716 A1 | 3/2010 | Stefik et al. | |
| 2010/0063961 A1 | 3/2010 | Guiheneuf et al. | |
| 2010/0070523 A1 | 3/2010 | Delgo et al. | |
| 2010/0070842 A1 | 3/2010 | Aymeloglu et al. | |
| 2010/0076968 A1 | 3/2010 | Boyns et al. | |
| 2010/0098318 A1 | 4/2010 | Anderson | |
| 2010/0106420 A1 | 4/2010 | Mattikalli et al. | |
| 2010/0162176 A1 | 6/2010 | Dunton | |
| 2010/0191563 A1 | 7/2010 | Schlaifer et al. | |
| 2010/0198684 A1 | 8/2010 | Eraker et al. | |
| 2010/0199225 A1 | 8/2010 | Coleman et al. | |
| 2010/0257515 A1 | 10/2010 | Bates et al. | |
| 2010/0262688 A1 | 10/2010 | Hussain et al. | |
| 2010/0293174 A1 | 11/2010 | Bennett et al. | |
| 2010/0321399 A1 | 12/2010 | Ellren et al. | |
| 2011/0022312 A1 | 1/2011 | McDonough et al. | |
| 2011/0061013 A1 | 3/2011 | Billicki et al. | |
| 2011/0078173 A1 | 3/2011 | Seligmann et al. | |
| 2011/0099133 A1 | 4/2011 | Chang et al. | |
| 2011/0117878 A1 | 5/2011 | Barash et al. | |
| 2011/0137766 A1 | 6/2011 | Rasmussen et al. | |
| 2011/0153384 A1 | 6/2011 | Horne et al. | |
| 2011/0161096 A1 | 6/2011 | Buehler et al. | |
| 2011/0170799 A1 | 7/2011 | Carrino et al. | |
| 2011/0191284 A1* | 8/2011 | Dalton | 706/58 |
| 2011/0208724 A1 | 8/2011 | Jones et al. | |
| 2011/0218934 A1 | 9/2011 | Elser | |
| 2011/0225198 A1 | 9/2011 | Edwards et al. | |
| 2011/0270604 A1 | 11/2011 | Qi et al. | |
| 2011/0270705 A1 | 11/2011 | Parker | |
| 2011/0314007 A1 | 12/2011 | Dassa et al. | |
| 2012/0011238 A1 | 1/2012 | Rathod | |
| 2012/0066166 A1 | 3/2012 | Curbera et al. | |
| 2012/0066296 A1 | 3/2012 | Appleton et al. | |
| 2012/0079363 A1 | 3/2012 | Folting et al. | |
| 2012/0106801 A1 | 5/2012 | Jackson | |
| 2012/0130937 A1* | 5/2012 | Leon et al. | 706/52 |
| 2012/0131512 A1 | 5/2012 | Takeuchi et al. | |
| 2012/0144335 A1 | 6/2012 | Abeln et al. | |
| 2012/0159362 A1 | 6/2012 | Brown et al. | |
| 2012/0159363 A1 | 6/2012 | DeBacker et al. | |
| 2012/0173381 A1 | 7/2012 | Smith | |
| 2012/0173985 A1 | 7/2012 | Peppel | |
| 2012/0206469 A1 | 8/2012 | Hulubei et al. | |
| 2012/0208636 A1 | 8/2012 | Feige | |
| 2012/0221553 A1 | 8/2012 | Wittmer et al. | |
| 2012/0221580 A1 | 8/2012 | Barney | |
| 2012/0323888 A1 | 12/2012 | Osann, Jr. | |
| 2013/0006725 A1 | 1/2013 | Simanek et al. | |
| 2013/0021445 A1 | 1/2013 | Cossette-Pacheco et al. | |
| 2013/0057551 A1* | 3/2013 | Ebert et al. | 345/440 |
| 2013/0060786 A1 | 3/2013 | Serrano et al. | |
| 2013/0073377 A1 | 3/2013 | Heath | |
| 2013/0096988 A1 | 4/2013 | Grossman et al. | |
| 2013/0101159 A1 | 4/2013 | Chao et al. | |
| 2013/0150004 A1 | 6/2013 | Rosen | |
| 2013/0151453 A1 | 6/2013 | Bhanot et al. | |
| 2013/0166480 A1 | 6/2013 | Popescu et al. | |
| 2013/0176321 A1 | 7/2013 | Mitchell et al. | |
| 2013/0179420 A1 | 7/2013 | Park et al. | |
| 2013/0185307 A1 | 7/2013 | El-Yaniv et al. | |
| 2013/0238616 A1 | 9/2013 | Rose et al. | |
| 2013/0246170 A1 | 9/2013 | Gross et al. | |
| 2013/0263019 A1 | 10/2013 | Castellanos et al. | |
| 2013/0268520 A1 | 10/2013 | Fisher et al. | |
| 2013/0279757 A1 | 10/2013 | Kephart | |
| 2013/0282696 A1 | 10/2013 | John et al. | |
| 2013/0282723 A1 | 10/2013 | Petersen et al. | |
| 2013/0290825 A1 | 10/2013 | Arndt et al. | |
| 2013/0297619 A1 | 11/2013 | Chandrasekaran et al. | |
| 2014/0012796 A1 | 1/2014 | Petersen et al. | |
| 2014/0040371 A1 | 2/2014 | Gurevich et al. | |
| 2014/0068487 A1 | 3/2014 | Steiger et al. | |
| 2014/0095509 A1 | 4/2014 | Patton | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0136285 A1 | 5/2014 | Carvalho | |
| 2014/0143009 A1 | 5/2014 | Brice et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0222793 A1 | 8/2014 | Sadkin et al. | |
| 2014/0333651 A1 | 11/2014 | Cervelli et al. | |
| 2014/0337772 A1 | 11/2014 | Cervelli et al. | |
| 2014/0361899 A1 | 12/2014 | Layson | |
| 2014/0366132 A1 | 12/2014 | Stiansen et al. | |
| 2015/0029176 A1 | 1/2015 | Baxter et al. | |

FOREIGN PATENT DOCUMENTS

| | | |
|---|---|---|
| DE | 102014204830 | 9/2014 |
| DE | 102014204834 | 9/2014 |
| DE | 102013222023 | 1/2015 |
| EP | 0763201 | 3/1997 |
| EP | 2575107 | 4/2013 |
| EP | 2528018 | 4/2015 |
| EP | 2858014 | 4/2015 |
| GB | 2516155 | 1/2015 |
| NL | 2012778 | 11/2014 |
| NZ | 624557 | 12/2014 |
| WO | WO 95/32424 | 11/1995 |
| WO | WO 00/09529 | 2/2000 |
| WO | WO 2004/057268 | 7/2004 |
| WO | WO 2005/013200 | 2/2005 |
| WO | WO 2009/061501 | 5/2009 |
| WO | WO 2009/123975 | 10/2009 |
| WO | WO 2011/058507 | 5/2011 |

OTHER PUBLICATIONS

Gorr et al, Crime Hot Spot Forecasting: Modeling and Comparative Evaluation, 2002.*
Gorr, Proposed Crime Early Warning System Software, 2003.*
Karuppannan et al, Crime Analysis Mapping in India: A GIS Implementation in Chennai City, 2000.*
Ravi et al, Soft computing system for bank performance prediction, 2007.*
Rayment, Spatial and Temporal Crime Analysis Techniques, 1995.*
Sandig et al, Mining Online GIS for Crime Rate and Models based on Frequent Pattern Analysis, 2013.*
CrimeStat Spatial Statistics Program (http://www.icpsr.umich.edu/NACJD/crimestat.html, accessed Mar. 31, 2004).*
Valentini et al, Ensembles of Learning Machines, 2002.*
Short et al., "Measuring and Modeling Repeat and Near-Repeat Burglary Effects", Springerlink,.com, dated 2009, 15 pages.
Olligschlaeger, Andreas, "Artificial Neural Networks and Crime Mapping", Carnegie Mellon University, dated 1997, 35 pages.
Mohler et al., "Self-Exciting Point Process Modeling of Crime", American Statistical Association, dated 2011, 9 pages.

(56) References Cited

OTHER PUBLICATIONS

Kong, Steve, "Return of the Burglar", Masters Course in Crime Science, dated Sep. 2005, 52 pages.
Jacob et al., "The Dynamics of Criminal Behavior: Evidence From Weather Shocks", NBER Working Paper Series, National Bureau of Economic Research, dated Sep. 2004, 59 pages.
Horrocks et al., "The Effects of Weather on Crime", dated 2008, 40 pages.
Groff et al., "Forecasting the Future of Predictive Crime Mapping", Crime Prevention Studies, dated 2002 vol. 13, 29 pages.
Gorr et al., "Crime Hot Spot Forecasting: Modeling and Comparative Evaluation, Summary", dated Jul. 3, 2002, 38 pages.
Chainey et al., "The Utility of Hotspot Mapping for Predicting Spatial Patterns of Crime", Security Journal, dated 2008, 25 pages.
Caplan, Joel M. Mapping the Spatial Influence of Crime Correlates: A Comparision of Operationalization Schemes and Implications for Crime Analysis and Criminal Justice Practice dated 2011, 27 pages.
Butke et al., "An Analysis of the Relationship Between Weather and Aggressive Crime in Cleveland, Ohio", American Meteorological Society, dated Apr. 2010, 13 pages.
Bowers et al., "Prospective Hot Spotting", The Future of Crime Mapping?, Advance Access Publication dated May 7, 2004, 18 pages.
Aldor-Noiman et al., "Spatio-Temporal Low Count Processes with Application to Violent Crimes Events", dated Apr. 23, 2013, 44 pages.
"A First Look: Predicting Market Demand for Food Retail using a Huff Analysis," TRF Policy Solutions, Jul. 2012, pp. 30.
"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Barnes et al., "Viewshed Analysis", GIS-ARC/INFO 2001, <www.evsc.virginia.edu/~jhp7e/evsc466/student_pres/Rounds.pdf>.
Capptain—Pilot Your Apps, <http://www.capptain.com> Printed Jul. 18, 2013 in 6 pages.
Carver et al., "Real-Time Visibility Analysis and Rapid Viewshed Calculation Using a Voxel-Based Modelling Approach," GISRUK 2012 Conference, Apr. 11th-13th, Lancaster UK, Apr. 13, 2012, pp. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Countly Mobile Analytics, <http://count.ly/> Printed Jul. 18, 2013 in 9 pages.
Definition "Identify" downloaded Jan. 22, 2015, 1 page.
Definition "Overlay" downloaded Jan. 22, 2015, 1 page.
DISTIMO—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, <http://www.flurry.com/> Printed Jul. 18, 2013 in 14 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Glaab et al., "EnrichNet: Network-Based Gene Set Enrichment Analysis," Bioinformatics 28.18 (2012): pp. i451-i457.
Google Analytics Official Website—Web Analytics & Reporting, <http://www.google.com/analytics.index.html> Printed Jul. 18, 2013 in 22 pages.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Hua et al., "A Multi-attribute Data Structure with Parallel Bloom Filters for Network Services" HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Hur et al., "SciMiner: web-based literature mining tool for target identification and functional enrichment analysis," Bioinformatics 25.6 (2009): pp. 838-840.
Ipbucker, C., "Inverse Transformation for Several Pseudo-cylindrical Map Projections Using Jacobian Matrix," ICCSA 2009, Part 1 LNCS 5592, pp. 553-564.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Mixpanel—Mobile Analytics, <https://mixpanel.com/> Printed Jul. 18, 2013 in 13 pages.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary: Unconnected ways and other data quality issues," http://www.openstreetmap.org/user/amm/diary printed Jul. 23, 2012 in 3 pages.

(56) References Cited

OTHER PUBLICATIONS

Open Web Analytics (OWA), <http://www.openwebanalytics.com/> Printed Jul. 19, 2013 in 5 pages.

Piwik—Free Web Analytics Software. <http://piwik.org/> Printed Jul. 19, 2013 in18 pages.

POI Editor, "How to: Create Your Own Points of Interest," <http://www.poieditor.com/articles/how_to_create_your_own_points_of_interest/> printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/Irsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classified Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12> printed Jan. 3, 2013 in 1 page.

StatCounter—Free Invisible Web Tracker, Hit Counter and Web Stats, <http://statcounter.com/> Printed Jul. 19, 2013 in 17 pages.

Tangelder et al., "Freeform Shape Matching Using Minkowski Operations," The Netherlands, Jun. 1996, pp. 12.

TestFlight—Beta Testing on the Fly, <http://testflightapp.com/> Printed Jul. 18, 2013 in 3 pages.

trak.io, <http://trak.io/> printed Jul. 18, 2013 in 3 pages.

UserMetrix, <http://usermetrix.com/android-analytics> printed Jul. 18, 2013 in 3 pages.

VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Vose et al., "Help File for ModelRisk Version 5," 2007, Vose Software, pp. 349-353. [Uploaded in 2 Parts].

Wikipedia, "Douglas-Peucker-Algorithms," <http://de.wikipedia.org/w/index.php?title=Douglas-Peucker-Algorithmus&oldid=91846042> printed Jul. 2011, pp. 2.

Wikipedia, "Ramer-Douglas-Peucker Algorithm," <http://en.wikipedia.org/wiki/Ramer%E2%80%93Douglas%E2%80%93Peucker_algorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

Zheng et al., "GOEAST: a web-based software toolkit for Gene Ontology enrichment analysis," Nucleic acids research 36.suppl 2 (2008): pp. W385-W363.

Notice of Acceptance for Australian Patent Application No. 201221622 dated Jan. 6, 2015.

Official Communication for New Zealand Patent Application No. 628840 dated Aug. 28, 2014.

Official Communication for New Zealand Patent Application No. 628585 dated Aug. 26, 2014.

Official Communication for Great Britain Patent Application No. 1408025.3 dated Nov. 6, 2014.

Official Communication for Australian Patent Application No. 2014202442 dated Mar. 19, 2015.

Official Communication for Great Britain Patent Application No. 1404499.4 dated Sep. 29, 2014.

Official Communication for Great Britain Patent Application No. 1404489.5 dated Oct. 6, 2014.

Official Communication for Great Britain Patent Application No. 1404486.1 dated Aug. 27, 2014.

Official Communication for Great Britain Patent Application No. 1404499.4 dated Aug. 20, 2014.

Official Communication for Great Britain Patent Application No. 1404489.5 dated Aug. 27, 2014.

Official Communication for New Zealand Patent Application No. 622473 dated Mar. 27, 2014.

Official Communication for New Zealand Patent Application No. 622473 dated Jun. 19, 2014.

Official Communication for New Zealand Patent Application No. 622513 dated Apr. 3, 2014.

Official Communication for New Zealand Patent Application No. 628161 dated Aug. 25, 2014.

Official Communication for European Patent Application No. 14187996.5 dated Feb. 12, 2015.

Manno et al., "Introducing Collaboration in Single-user Applications Through the Centralized Control Architecture", IEEE, dated 2010, 10 pages.

* cited by examiner

CRIME RISK FORECASTING

RELATED APPLICATIONS

This application is related to U.S. patent application Ser. No. 13/917,571, filed Jun. 13, 2013, entitled "Interactive Geospatial Map", which is incorporated by reference herein in its entirety.

TECHNICAL FIELD

The disclosed embodiments relate generally to computing devices, and in particular, to computing devices and computer-implemented methods for generating crime risk forecasts and conveying the forecasts to a user.

BACKGROUND

Interactive geospatial maps, such as those produced by Internet-based mapping systems or other computer-based geospatial information systems (GIS), are available from a number of providers. These interactive maps typically comprise satellite imagery or graphical basemaps that provide an aerial or bird's-eye perspective of a curved geographic surface, such as the surface of the Earth, after being projected using a map projection (e.g., a Mercator map projection). Some of the interactive basemaps may include one or more situational data layers displayed as overlays on the basemaps that visually convey various situational features such as roads, traffic, buildings, parks, restaurants, banks, schools, and other situational features.

SUMMARY

The claims section appended hereto provides a useful summary of some embodiments of the present invention.

DESCRIPTION OF EMBODIMENTS

Figure 1A:
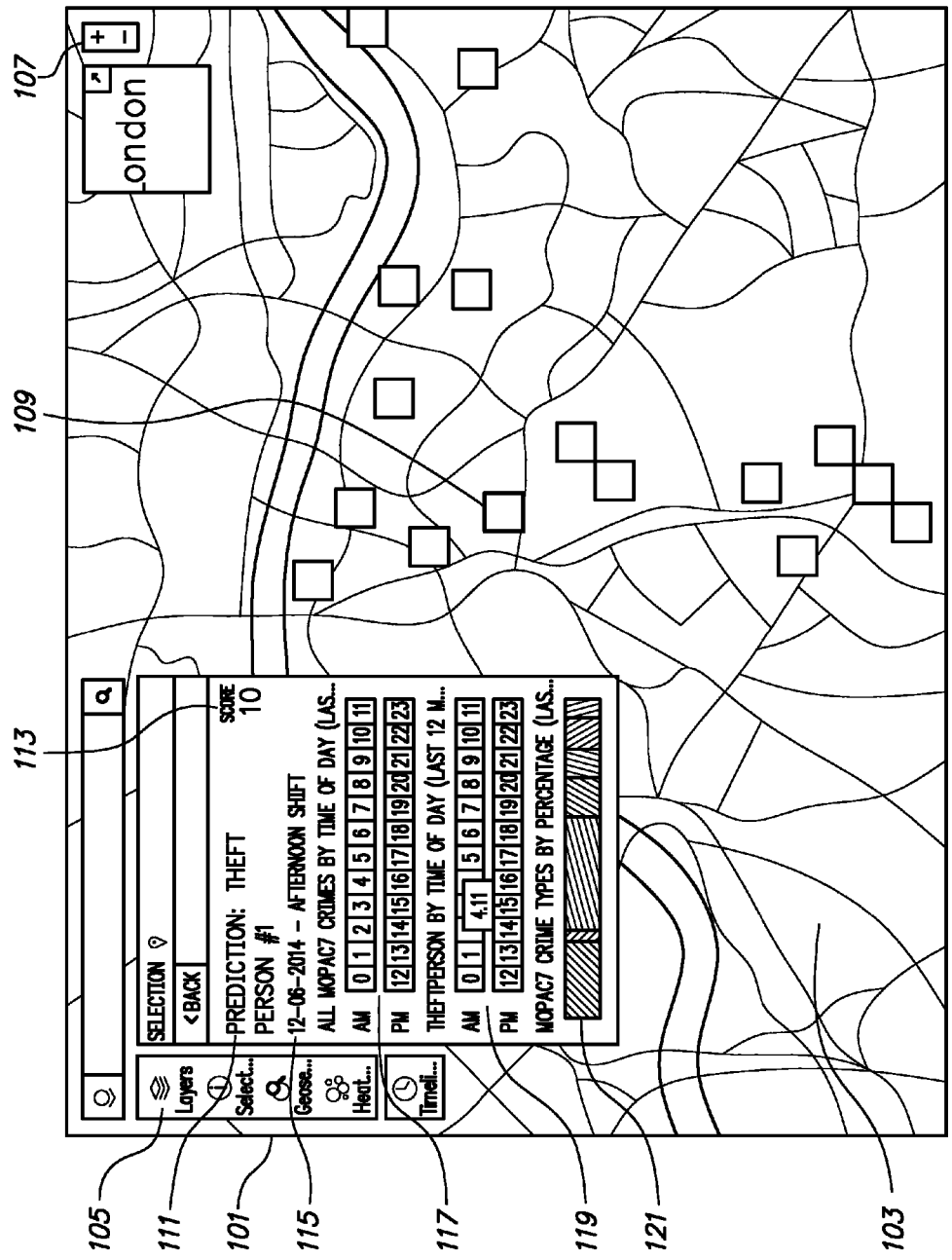
FIG. 1A is a screen shot of a computer graphical user interface showing an example generated crime risk forecast overlay to an interactive geospatial basemap according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Police departments and other law enforcement agencies would like to know when and where crimes are most likely to occur in the future in order to most efficiently and effectively allocate crime prevention resources. A computer-based crime risk forecasting system and corresponding method are provided for generating crime risk forecasts and conveying the forecasts to a user. The user may be a police officer or other law enforcement official, for example. With the conveyed forecasts, the user can more effectively gauge both the level of increased crime threat and its potential duration. The user can then leverage the information conveyed by the forecasts to take a more proactive approach to law enforcement in the affected areas during the period of increased crime threat.

Crime Risk Forecasting System

According to an embodiment of the present invention, crime risk forecasts are generated and conveyed by a computer-based crime risk forecasting system. The crime risk forecasting system has at least two components: a forecasting component and a display component. The forecasting component and the display component may each be implemented in software, in hardware, or in a combination of software and hardware according to the requirements of the particular implementation at hand.

The forecasting component can use a number of different algorithms for generating the crime risk forecasts. Exemplary crime risk forecasting algorithms are described in greater detail below.

The display component provides functionality for displaying generated forecasts to a user of the system. The display component incorporates a geospatial application capable of generating interactive geospatial basemaps such as, for example, those disclosed in related U.S. patent application Ser. No. 13/917,571, filed Jun. 13, 2013, entitled "Interactive Geospatial Map", which is incorporated by reference herein in its entirety.

The display component displays the generated crime risk forecast as an overlay to an interactive geospatial basemap generated by the geospatial application. By incorporating interactive geospatial basemaps generated by the geospatial application, the display component can provide environmental context to the conveyed forecast. The environmental context may indicate nearby buildings, roads, banks, automated teller machines, public transportation hubs, subway entrances and exits, and other environmental and situational information which can suggest why a geographic area is forecasted as a crime risk.

Crime Risk Forecasts

The crime risk forecast is generated for a "target geographic area", or just "target area" for short. For example, the target area may correspond to 250 by 250 square meters of a geographic area. For example, the target area may correspond to a city block, or a portion thereof. Other sized target areas are possible and the target area need not correspond to only a 250 square meter geographical area. More generally, the size of a target area may vary from implementation to implementation according to the requirements of the particular implementation at hand.

In addition to being generated for the target area, the crime risk forecast may also be generated for a time window. As used herein, the term "time window" refers to a continuous period of time. For example, the time window for which the forecast is generated may correspond to an 8-hour law enforcement patrol shift on a particular day. For example, the day may be divided into three patrol shifts: a morning shift from 6 A.M. to 2 P.M., a late shift from 2 P.M. to 10 P.M., and a night shift from 10 P.M. to 6 A.M. A time window may correspond to one of the three patrol shifts on a given day. Other length time windows are possible and a time window need not be only 8-hours in length or span only a single day. More generally, the length of the time window may vary from implementation to implementation according to the requirements of the particular implementation at hand.

In addition to being generated for the target area and the time window, the crime risk forecast may also be generated for a predefined crime type in a set of predefined crime types. For example, the set of predefined crime types may include one or more general personal and property crimes such as assault, battery, kidnapping, homicide, offenses of a sexual nature, larceny (theft), robbery (theft by force), vehicle theft, burglary, arson, and so forth. In some instances, the set of predefined crime types includes a crime type that is a combination of two or more crime types. For example, the set of predefined crime types may include a robbery and theft crime type instead of having separate robbery and theft crime types. More generally, the set of predefined crime types for which the forecast can be generated may vary from implementation to implementation according to the requirements of the particular implementation at hand.

Multiple crime risk forecasts may be generated for the same target area in which each forecast corresponds to a predefined crime type and a time window. For example, a crime risk forecast may be generated for burglary during the late patrol shift on a particular day in a target area, another forecast generated for burglary during the early patrol shift on the particular date in the target area, yet another forecast generated for vehicle theft during the late patrol shift on the particular date in the target area, and so forth.

A generated crime risk forecast has a visible manifestation presented to the user. For example, the visible manifestation can be presented to the user in a web browser or other computer graphical user interface. The visible manifestation of the crime risk forecast includes a visually highlighted area corresponding to the target area on the interactive geo spatial basemap generated by the geo spatial application. The visually highlighted area indicates the geographic target area the crime risk forecast applies to.

The visual highlighting of the target area can take a variety of different forms including a bounding box or other geometric outline that indicates the geographic borders of the target area relative to the interactive geo spatial basemap. The interior of the outlined geographic shape may also be colored with a semi-transparent fill that allows for visual perception of the underlying basemap, at least some degree corresponding to the level of transparency of the fill color. The fill color may indicate, for example, that the visual highlighting corresponds to a crime risk forecast, as opposed to a previous crime incident.

In addition to indicating the target area to which the crime risk forecast applies, the visible manifestation may convey a crime risk rating for the crime type and the time window the forecast was generated for. The crime risk rating conveys to the user the crime risk level in the target area for the crime type during the time window. For example, the risk rating may be a quantitative value such as a number on a scale of 1 to 10, with 10 being the highest risk of the crime type occurring in the target area within the time window and 1 being the lowest risk of the crime type occurring in the target area and during the time window. Other risk rating scales are possible and a numerical risk rating scale of 1 to 10 is not required. For example, the crime risk rating scale could be "A", "B", "C", "D", "E" and "F" with "A" indicating the lowest (or highest) crime risk and "F" indicating the highest (or lowest) crime risk. Qualitative risk ratings such as "low risk", "moderate risk", and "high risk" are also possible.

In addition to visually highlighting the target area on the interactive geo spatial basemap and providing the risk rating, the visible manifestation of the crime risk forecast may convey the algorithm used to generate the forecast. In some instances, a different algorithm is used to generate forecasts for different time windows. For example, forecasts generated for the early patrol shift, the late patrol shift, and the night patrol shift may be generated by different algorithms. The visible manifestation of the crime risk forecasts may indicate which particular algorithm was used to generate the risk ratings for each of the time windows. By doing so, the user can acquire a better sense of why a risk rating for a time window (e.g., the early shift) may be similar or different from a risk rating for another time window (e.g., the night shift).

FIG. 1A is a screen shot of a computer graphical user interface 101 showing an example generated crime risk forecast overlay to an interactive geo spatial basemap 103 according to an embodiment of the present invention. The interactive geo spatial basemap 103 is generated by a geospatial application and the overlay is generated by the display component of the crime risk forecasting system based on a crime risk forecast generated by the forecasting component of the crime risk forecasting system. The interactive geo spatial basemap 103 includes graphical user interface controls 105 and 107 for adjusting the display of the basemap 103. In particular, controls 105 allow the user to selectively add and remove geospatial situational layers to and from the basemap 105. The layers can include, but are not limited to, one or more vector layers that convey geographical regions, roads, bridges, buildings/structures, terrain, transportation hubs, utilities, infrastructure, street lights, hotels/motels, railroads, hospitals, other types of buildings or structures, regions, transportation objects, and/or other types of entities and events. The vector layers may overlay one or more base layers to form basemap 103. The base layers may include, for example, overhead (e.g., aerial or satellite) imagery, topographic, blank projected (e.g., Mercator projected), basemap, and blank unprojected. Controls 107 allow the user to adjust the zoom level of the basemap 103 either by increasing the zoom level to a smaller geographic area but in greater detail or by decreasing the zoom level to a larger geographic area but in less detail.

Basemap 103 includes a map of a city. In particular, basemap 103 represents an area of London. Basemap 103 is overlaid with a number of squares each representing the target area of a corresponding crime risk forecast generated by the forecasting component. One of the squares 109 is currently selected by the user and the details of the corresponding crime risk forecast are shown in a panel overlay to the basemap 103 generated by the display component. In particular, the overlay panel shows that the crime risk forecast corresponding to square 109 is for the crime type 111 Theft Person and for the time window 115 of the afternoon shift on Jun. 12, 2014. The panel overlay also includes a risk rating 113 of 10.

The overlay panel generated by the display component also includes other contextual information to aid the user in better understanding the selected crime risk forecast. In particular, time of day graphical user interface element 117 color codes each hour of the day by the number of the historical crimes that occurred in the hour irrespective of crime type. Relatively darker coloring indicates that relatively more of the historical crime incidents occurred during that hour of the day. Relatively lighter coloring indicates that relatively fewer of the historical crime incidents occurred during that hour of the day. For example, the relatively darker coloring to the 9 a.m. hour suggests that higher crime activity may be associated with persons arriving at work in downtown London. Time of day graphical user interface element 119 is like element 117 except just for historical crime incidents of the crime type Theft Person. The relatively darker coloring to the 9 a.m. hour suggests that a relatively higher number of incidents of Theft Person crime type may also be associated with persons arriving at work in downtown London. Color bar 121 breaks down all historical crime incidents in the last twelve months based on which the corresponding crime risk forecast is generated by crime type where each different color corresponds to a different crime type and the percentage of the color bar 121 occupied by a color represents the percentage of all historical crime incidents in the last twelve months that are of the corresponding crime type.

Figure 1B:
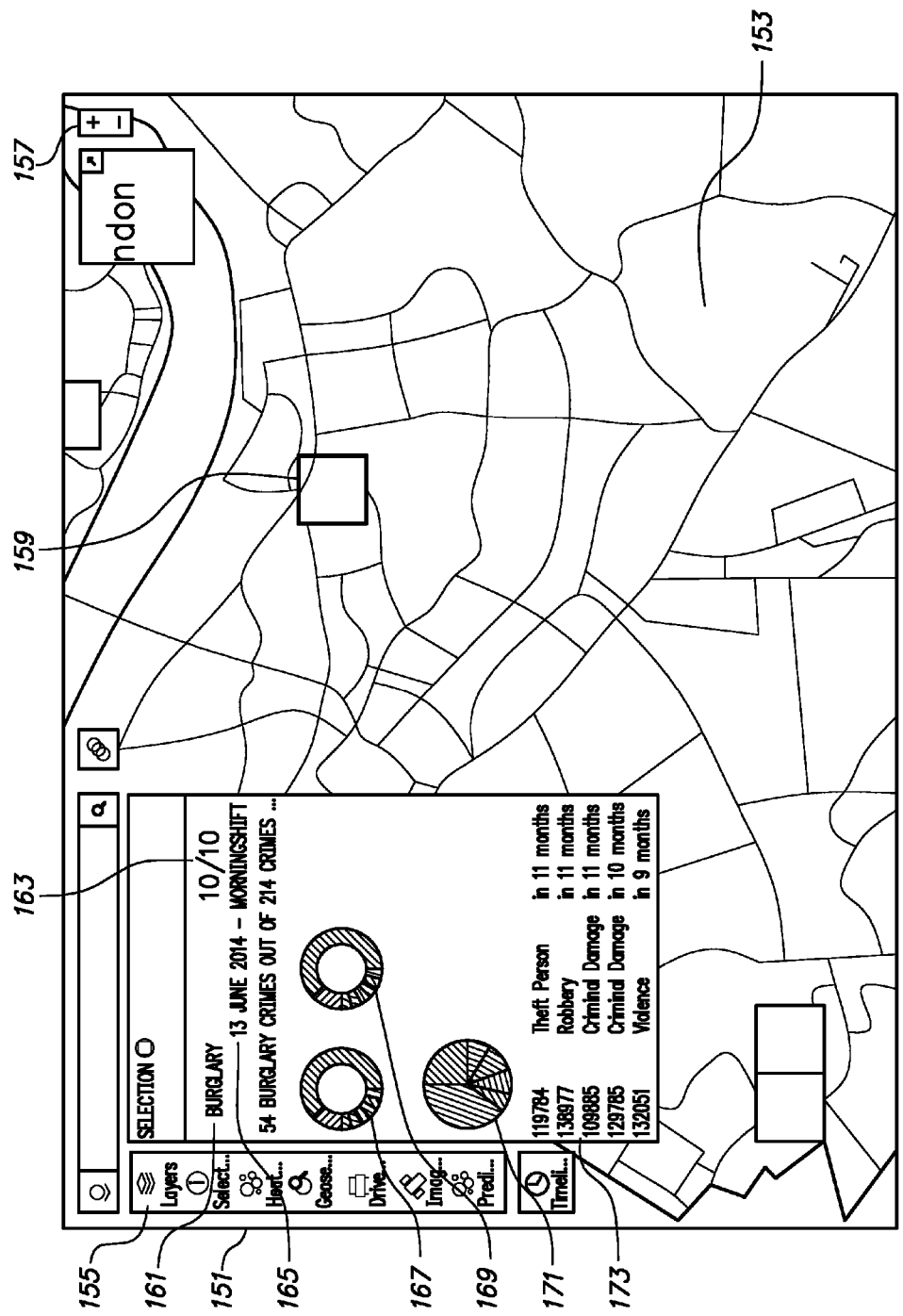
FIG. 1B is another screen shot of a computer graphical user interface showing another example generated crime risk forecast overlay to an interactive geo spatial basemap according to an embodiment of the present invention.

FIG. 1B is a screen shot of a computer graphical user interface 151 showing another example generated crime risk forecast overlay to an interactive geo spatial basemap 153 according to an embodiment of the present invention. Like in basemap 103 of FIG. 1A, the interactive geospatial basemap 153 is generated by a geospatial application and the overlay is generated by the display component of the crime risk forecasting system based on a crime risk forecast generated by the forecasting component of the crime risk forecasting system.

Basemap 153 includes a map of a city. In particular, basemap 153 represents an area of London. Basemap 153 is overlaid with a number of squares each representing the target area of a corresponding crime risk forecast generate by the forecasting component. One of the squares 159 is currently selected by the user and the details of the corresponding crime risk forecast are shown in a panel overlay to the basemap 153 generated by the display component. In particular, the overlay panel shows that the crime risk forecast corresponding to square 159 is for the crime type 161 Burglary and for the time window 165 of the morning shift on Jun. 13, 2014. The panel overlay also includes a risk rating 163 of 10 out of 10.

In this example, as indicated in the overlay panel, the crime risk forecast is generated based on 214 historical crime incidents, 54 of which are burglary crime types. Color wheel graphical user interface element 167 color codes each hour of the day by the number of the 214 historical crime incidents that occurred in the hour irrespective of crime type. Relatively darker coloring indicates that relatively more of the 214 historical crime incidents occurred during that hour of the day. Relatively lighter coloring indicates that relatively fewer of the 214 historical crime incidents occurred during that hour of the day. Color wheel element 169 is like element 167 except just for the 54 of the 214 historical crime incidents that are of the crime type Burglary. Pie chart 171 is like color bar 121 of FIG. 1A except that it shows percentages by pie slices instead of by coloring portions of a color bar. Listing 173 shows the last five historical crime incidents to have occurred in the geographical area represented by square 159 and when they occurred.

By generating a visual manifestation of a crime risk forecast as an overlay to an interactive geo spatial basemap generated by a geo spatial application, the layering features and functions of the geo spatial application can be used to provide the user greater context to the forecast. In particular, the user can add and remove situational geospatial layers to provide environment context to the forecast. The environmental context may indicate nearby buildings, roads, banks, automated teller machines, public transportation hubs, subway entrances and exits, and other environmental and situational information which can suggest why a geographic area is forecasted as a crime risk.

Generating a Crime Risk Forecast Based on Machine Learning

As described in greater detail below, a number of different algorithms may be used to generate a crime risk forecast. In some instances, a crime risk forecast is based on machine learning.

When generating a crime risk forecast based on machine learning, historical crime incident features may be taken into account. Such features may include, for example, frequency of crime incidents in the target area, the number of crime incidents in the target area in a past period of time (e.g., the past week), the number of crime incidents in the target area in an extended past period of time (e.g., the past few weeks), the number of crime incidents in a past period of time in neighboring areas, and so forth.

To generate a crime risk forecast based on machine learning, a machine learning algorithm such as, for example, a support vector machine, neural network, logistic regression or any other algorithm may be applied to available historical crime incident features. Example neural network and logistic regression algorithms for generating crime risk forecasts are described in greater detail below.

A crime risk forecast generated by machine learning may be based on historical crime incident data associated with the target area. The historical crime incident data may pertain to only incidents within the target area over a given period(s) of time. Alternatively, the historical crime incident data may also pertain to incidents within neighboring or surrounding areas over a given period(s) of time.

In addition to the historical crime incident data, machine learning can be used to generate a crime risk forecast based on "non-incident" historical information. Such non-incident historical information may include, for example, weather information for the target area over a given period(s) of time and level of law enforcement patrol presence in or near the target area over a given period(s) of time.

Level of law enforcement patrol presence in or near a target area can be determined from global positioning system (GPS) information obtained from radio equipment used by patrol officers over a given period(s) of time. Thus, crime risk forecasts generated according to the present invention are not limited to being generated based only on historical crime incident information but may also be based on other types of historical information such as historical weather information and historical law enforcement officer patrol activity.

Further, by collecting and maintaining information on historical law enforcement officer patrol activity in or near a target area and presenting such information in conjunction with a crime risk forecast for the target area, the user can see the relationship between historical law enforcement presence in or near the target area and the predicted risk of crime in the target area. For example, a first generated crime risk forecast for a first target area can indicate that the future crime risk in the first target area is relatively low and a second generated crime risk forecast for a second target area can indicate that the future crime risk in the second target area is relatively high. At the same, an indication of historical law enforcement presence in or near the first target area can indicate that the historical presence was relatively high and another indication of historical law enforcement presence in or near the second target area can indicate that the historical presence was relatively low. Based on conveying these forecasts and law enforcement presence indications to the user, the user may decide to re-allocate some of the patrols assigned to areas in or near the first target area to areas in or near the second target area.

Historical Crime Incident Data

Historical crime incident data on which generated crime risk forecasts may be based can include metadata pertaining to crime incidents. Such metadata may include the crime type, the date and time of the crime, the geographic location of the crime and the method of the crime.

The crime type can be one of an enumeration such as burglary, robbery, theft of vehicle, theft from vehicle, criminal damage, violence, and so forth.

The date and time may correspond to a law enforcement or police dispatch time, for example, or other date and time that indicates when the corresponding crime incident occurred or was reported to law enforcement.

In some instances the date and time of the crime is a date/time range as opposed to a discrete point in time. In these instances, the date and time of the crime can be treated as a uniform probability distribution over the date/time range.

In an embodiment, a geographic surface region is divided into uniformly sized areas in a grid-like fashion and location metadata for a crime incident specifies or indicates one of the areas in a region.

Figure 2:
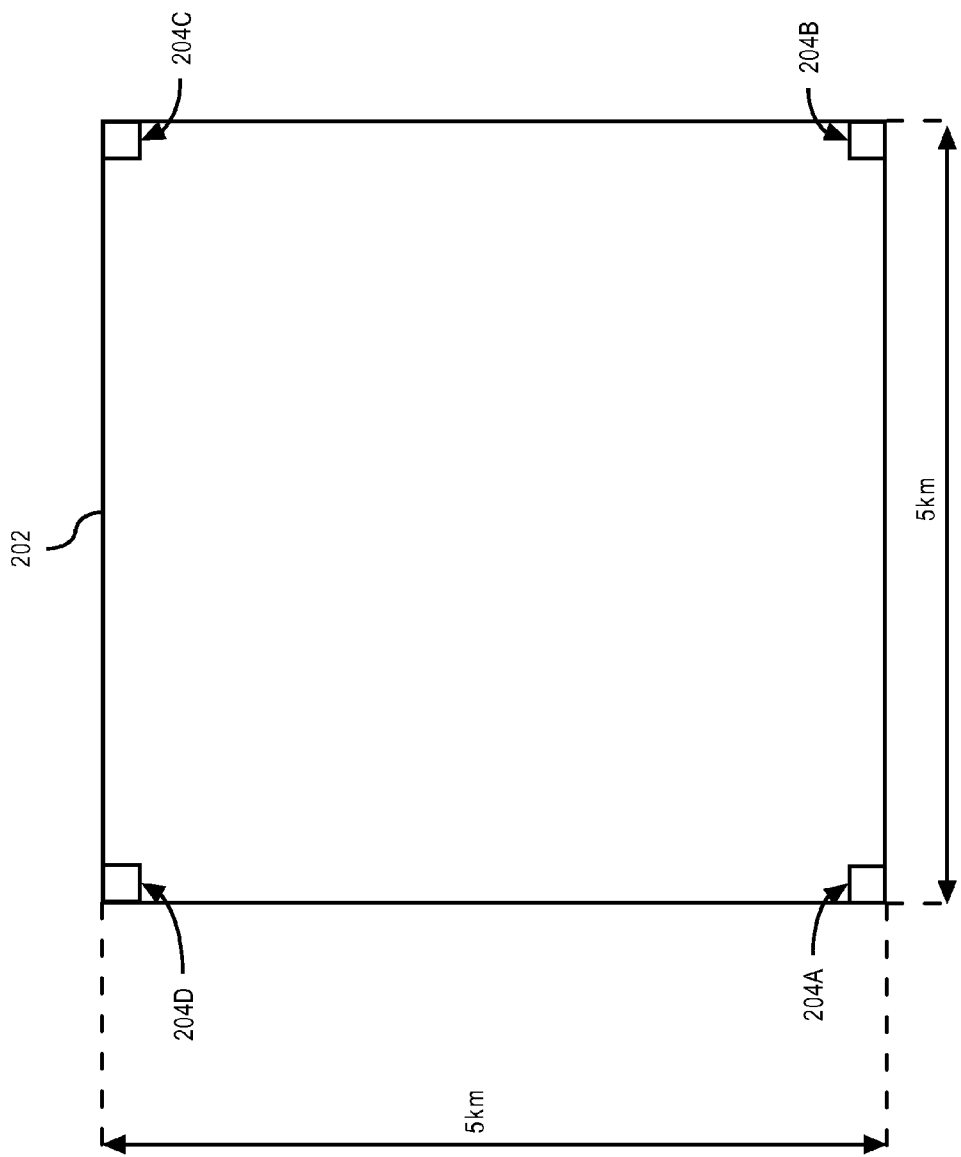
FIG. 2 is a schematic of a 5 kilometer by 5 kilometer geographic surface region divided into 400 square grid areas, each 250 by 250 meters in length.

FIG. 2 is a schematic of a 5 kilometers (km) by 5 km region 202 divided into 400 square grid cells, each 250 by 250 meters (m) in length. In this example, only four of the 400 square grid cells are illustrated and are labeled 204A, 204B, 204C, and 204D. Region 202 and cells within region 202 can by defined with respect to a geographic surface by geographic coordinates such as latitude and longitude coordinates. Region 202, for example, may correspond to a town or a neighborhood of a city. Cells within region 202 may correspond to a portion of the town or neighborhood such as, for example, a portion of a city block.

Region 202 may be of square or rectangular dimensions other than 5 km by 5 km or any other shape. Similarly, cells with region 202 may be of square or rectangular dimensions other than 250 m by 250 m or any other shape, according to the requirements of the particular implementation at hand.

Location metadata for a historical crime incident can specify a cell in a region where the crime incident occurred. For example, the location metadata can include a region identifier that specifies the region within which the crime incident occurred.

The location metadata can also include grid coordinates that specifies a cell 204 within the identified region 202 within which the crime incident occurred. For example, each cell within a region may be identified by an x, y grid coordinate, where x corresponds to the horizontal axis of the region and y corresponding to the vertical axis of the region. For example, cell 204A in region 202 may be identified by the grid coordinate x=1, y=1; cell 204B identified by the grid coordinates x=20, y=1; cell 204C identified by the grid coordinates x=20, y=20; cell 204D identified by the grid coordinates x=1, y=20; and so forth. Other grid coordinate schemes as possible and the present invention is not limited to any particular manner for specifying a cell within a region in location metadata.

In addition to or instead of explicitly specifying a region and a cell within the region within which the crime incident occurred, the location metadata can indicate the cell and region where the crime incident occurred without explicitly identifying the regions and the cell. In this case, the metadata indicating the cell and region will need to be resolved to determine the particular cell 204 and the particular region 202 the metadata indicates. For example, if the location metadata is a street address location of the crime incident, the street address can be resolved to geographic coordinates (e.g., latitude/longitude coordinates) using a geocoding application. Then, the geographic coordinates returned for the street address by the geocoding application can be resolved to a particular cell within a particular region based on geographic coordinates associated with the particular cell and the particular region. For example, the particular cell and particular region can be determined by identifying the region and the cell within the region the geographic coordinates for the street address are within or nearest to. Alternatively, the location metadata can indicate a region and a cell within the region with geographic coordinates. In this case, consulting a geocoding application to resolve a street address would not be necessary.

While in some embodiments a geographic area is divided into region(s) and grid cells before crime risk forecasts are generated for the area, the area is divided in a grid-like fashion after crime risk forecasts are generated for the area in other embodiments. In other words, a particular algorithm for generating a crime risk forecast for a geographic area may not require the area to have been divided into grid cells prior to performing the algorithm to generate the forecast. However, a different algorithm may require an area to have been divided into grid cells before the algorithm can generate a forecast for a grid cell or cell(s) in the area.

Crime incident metadata for a historical crime incident can include information about the crime incident other than just the crime type, crime date/time, and crime location. For example, if the crime incident involves entry into physical premises such as a building, home, or office, then the crime metadata for the incident may indicate the entry method used by the perpetrator. For example, if the crime incident was a burglary of a home, then the metadata for the incident may specify whether the perpetrator entered through a window, through communal doors, and so forth. Including entry method metadata information about certain crime incidents allows separate crime incidents to be linked or associated together by entry method. More generally, crime incident metadata for a crime incident can indicate a primary crime type (e.g., burglary) and one or more sub-types or characteristics of the primary crime type (e.g., entry method). This allows separate crime incidents of the same primary type to be linked or associated together by their common sub-types or characteristics.

Crime incident metadata for a crime incident can also include free-form text provided by a reporting law enforcement officer. Such text may be a short description of the crime incident in the law enforcement officer's own words. Keywords may be extracted from the text and used to determine a location for the crime incident where no specific location is provided. For example, the text entered by the law enforcement officer may state that an incident occurred "in Appletown somewhere along First Street between Maple and Elm Avenues". Based on this text description, an approximate street address can be determined and fed to a geocoding application to obtain approximate geographic coordinates or a line or area where the incident occurred. The returned geographic coordinates or line or area can then be resolved to a grid cell(s) in a region as described above.

Custody Data

In addition to historical crime incident data, generation of a crime risk forecast may be based on custody data. The custody data may indicate persons apprehended or placed in law enforcement custody that are suspected to have or known to have committed certain crime incidents. Such custody information may be used to mathematically deemphasize the significance of these crime incidents when generating crime risk forecasts based on these crime incidents on the theory that such crime incidents are less likely to occur again now that the perpetrators of those crime incidents are in custody.

The custody data may also indicate when and where persons will be released from custody. Based on temporal and spatial custody release information, the significance of historical crime incidents in or near a target area where persons will be released from custody may be mathematically emphasized when generating a crime risk forecast for the target area based on these crime incidents on the theory that the persons released from custody have a significant probability of re-offending in or near the area they are released at. For example, when generating the crime risk forecast for the target area, historical crime incidents of the type perpetrated by the persons being released from custody in or near the target area may be mathematically emphasized on the theory that the persons released are more likely to re-commit the same types of crimes as opposed to other types of crimes.

Computer-Aided Dispatch (CAD) Data

In addition to custody data, generation of a crime risk forecast may be based on computer-aided dispatch (CAD) data. The CAD data may be obtained from a computer-aided dispatch (CAD) system or other computer system for dispatching public emergency personnel to respond to reported incidents. CAD data obtained for an incident may be used to create or supplement the historical crime incident data for the incident. In particular, information in the CAD data may be used to generate or populate the crime type, crime date/time, and/or the crime location metadata for the incident.

Prospective Hotspotting

According to an embodiment of the present invention, a prospective hotspotting algorithm is used to generate a crime risk forecast for a target area. To do so, historical crime incidents in or near the target area are analyzed. A set of possible historical crime incidents analyzed for generating the forecast can be circumscribed by time and space threshold parameters. In particular, only recent crime incidents within a specified geographic distance (e.g., a radial distance) of the target area may be analyzed. Here, recent crime incidents can be established by identifying nearby crime incidents that occurred, for example, after a specified time in the past. For example, the set of crime incidents used for generating the forecast can include crime incidents that occurred in the past week.

According to an embodiment of the prospective hotspotting technique for generating a crime risk forecast for a target area, the crime risk for the target area is a weighted sum over all previous crime incidents within a space and time threshold. Each previous crime incident within the space and time thresholds can be weighted using a decay function that takes into account how far in space and in time the crime incident is from the target area. In addition to the decay function, a spatiotemporal threshold can be applied so that, for example, only those events occurring within a 1 km geographic radial distance from the center of the target area and four (4) weeks of the current date/time are included in the calculation.

For example, the crime risk for a grid cell at particular time can be computed from a sum of a set of previous crime incidents:

$$A_{j,k}(t) = \sum_{i: t-T < T_i < t, \Delta S < S} \frac{1}{1+\Delta T} \frac{1}{1+\Delta S}$$

Here, $A_{j,k}(t)$ is the crime risk in grid cell (j, k) in a given geographic region at time t. T and S are the time and space threshold cut-off parameters, respectively. $\Delta T$ is the number of days between $T_i$ and t divided by T/10 where $T_i$ is the time of occurrence of one of n number of previous crime incidents over which the sum is being computed. $\Delta S$ is the geographic distance between a point (e.g., the centroid) of the geographic area covered by the grid cell (j, k) and a geographic location of the previous crime incident $S_i$.

As can be seen from the above equation, only previous crime incidents with locations and times within the time and space threshold cut-off parameters T and S, respectively, are included in the sum.

The prospective hotspotting technique can generate a more accurate crime risk forecast for a target area because it incorporates previous crime incidents for nearby areas and because it discounts previous nearby crime incidents as a function of their spatial and temporal distance from current forecast.

When generating a crime risk forecast for a particular crime type and a particular time window in addition to generating the crime risk forecast for the target area, the previous crime incidents within the time and space thresholds that are included in the sum can be limited to only those previous crime incidents that are of one or more particular crime types and that occurred within one or more particular time windows. For example, when generating a crime risk forecast for burglary during the late shift on a future date, the previous crime incidents can be limited to previous burglaries that occurred during the late shift within the space and time thresholds.

While in the above example the prospective hotspotting technique space and time thresholds are used to limit the previous crime incidents considered in the sum, a decay function can be used to limit the previous crime incidents included in the sum in other embodiments. For example, an exponential decay function can be used to limit the previous crime incidents included in the sum.

Histogram

According to an embodiment, a crime risk forecast generated for a target area is computed as the sum of previous crime incidents in the target area. For example, the crime risk for a grid cell at particular time can be computed from a sum of a set of previous crime incidents:

$$A_{j,k}(t) = \sum_{i: T_i < t} I(J_i = j, K_i = k)$$

The above-equation effectively functions as a simple histogram estimator. $A_{j,k}(t)$ is the crime risk in grid cell (j, k) in a given geographic region at time t. I is an indicator function that returns a positive numerical value (e.g., one) or zero for each previous crime incident in the set of previous crime incidents $T_i < t$, where $T_i$ is the time of the ith previous crime incident in the set. The indicator function I returns a positive numerical value if the location of the ith previous crime incident ($J_i$, $K_i$) was in the same grid cell (j,k) as the grid cell of the target area. Otherwise, the indicator function returns zero. Thus, only previous crime incidents that occurred in the target area are considered in the histogram approach.

Like with the prospective hotspotting technique, the previous crime incidents included in the sum can be limited to those of a particular crime type and corresponding to a particular time window.

Machine Learning Features

In one embodiment, logistic regression is used to generate a crime risk forecast from machine learning features. In one embodiment, the output of the logistic regression approach for a given target grid cell is whether that grid cell will or will not experience a crime at time t. This can be modeled as a random variable $C_{jkl} = \{0, 1\}$, where j, k, and l are space-time grid coordinates. In an embodiment, time l is discretized to a date.

Machine learning features can be built as a function $f$ of previous crime incidents and the discretized space-time coordinates of the target grid cell. For example, features $f_i(j, k, l, J_m, K_m, L_m)$ for time $L_m < l$ can be built.

For the regression of the random variable onto the features, dates to be predicated can be excluded from the regression.

In an embodiment, built features can be static features. For example, built features may be sparse vectors encoding the cell position (j, k). As another example, built features can be historical features that count previous crimes over a time window.

Instead of logistic regression, any other machine learning algorithm for example a support vector machine or feed forward neural network may be used to learn the effects of previous crime incidents.

The machine learning algorithm may also include different input such as historical weather information associated with the previous crime incidents. Other inputs may include computer-aided dispatch data, arrest data, and law enforcement patrol activity data.

To improve the performance of machine learning algorithms discussed herein, various features are extracted from the underlying data and used as inputs to the machine learning algorithms.

An example of a feature extraction method is a non-linear transformation in time and space, for example "distance to the nearest police station" or "square of the time elapsed since pub closing time".

Another example of a feature extraction method is known as "spatiotemporal cuboids". Previous crime incidents are projected onto a space-time "cuboid". Machine learning features are then built from the cuboid for each cell on each date in a date set. An example of one of the machine learning features that could be built is: how many crimes (or crimes of particular crime type and during a corresponding time window) occurred in the past 7 days within a 3 by 3 grid-cell neighborhood of the grid cell corresponding to the target area.

Another example of a feature extraction method is seasonal decomposition. Crime events are normalized according to seasonal patterns on various time scales (day of the week, month of the year etc.) in order to isolate the periodic component and reveal the underlying trend in the data.

Ensemble Method

In some embodiments, a forecast is generated from a weighted combination of forecasts produced by multiple algorithms. For example, a forecast for a target area for a particular crime type for a particular time window can be generated from a weighted combination of a) a first forecast for the target area for the particular crime type for the particular time window produced by the prospective hotspotting approach described above and b) a second forecast for the target area for the particular crime type for the particular time window generated by the histogram technique described above. Weights for each algorithm can be determined by comparing forecasts produced by the algorithm to the actual crime activity that occurred. Algorithms that produce more accurate forecasts receive greater weighting in the combination and algorithms that produce less accurate forecasts receive less weighting in the combination.

In one ensemble method approach, outputs of multiple criminological algorithms are treated as machine learning features. For example, the outputs of the prospective hotspotting and histogram approaches described above can be treated as machine learning features. The outputs of the multiple algorithms are then provided as input to a machine learning algorithm, potentially along with other machine learning feature inputs such as those described in the following section. The machine leaning algorithm can be a feed forward neural network with back propagation or logistic regression, as just some examples.

A function of the ensemble machine learning algorithm is to make a decision as to which algorithm(s) to use for the prediction using the input data as a guide. The input algorithms may have varying time scales, area, parameters and thus the machine learning step is effectively choosing how far back in time to look, how wide a geographic area to consider, etc. Where a neural network machine learning algorithm is used, this decision surface can be non-linear and thus potentially account for crime patterns varying over time, space, season, weather, patrol levels, custody release levels, etc. This approach in effect fuses the advantages of machine learning and automated pattern recognition with the more intuitive comprehensibility of the criminological approaches.

A benefit of the ensemble method is that it provides a way to more accurately account for the trade-off faced with the criminological approaches between capturing areas of long-term elevated risk and finding short-term fluctuations. For example, the ensemble method can more accurately decide when to pick a criminological algorithm with a longer time window.

In one embodiment, the training of the machine learning algorithm used in the ensemble method is restricted to a subset of the training examples. For example, the training set could be restricted to geographic areas of only high inherent risk. This would then bias the ensemble method forecast to weight towards algorithms that work well in these circumstances.

Web-Based Geographic Crime Risk Forecasting Computer System

Figure 3:
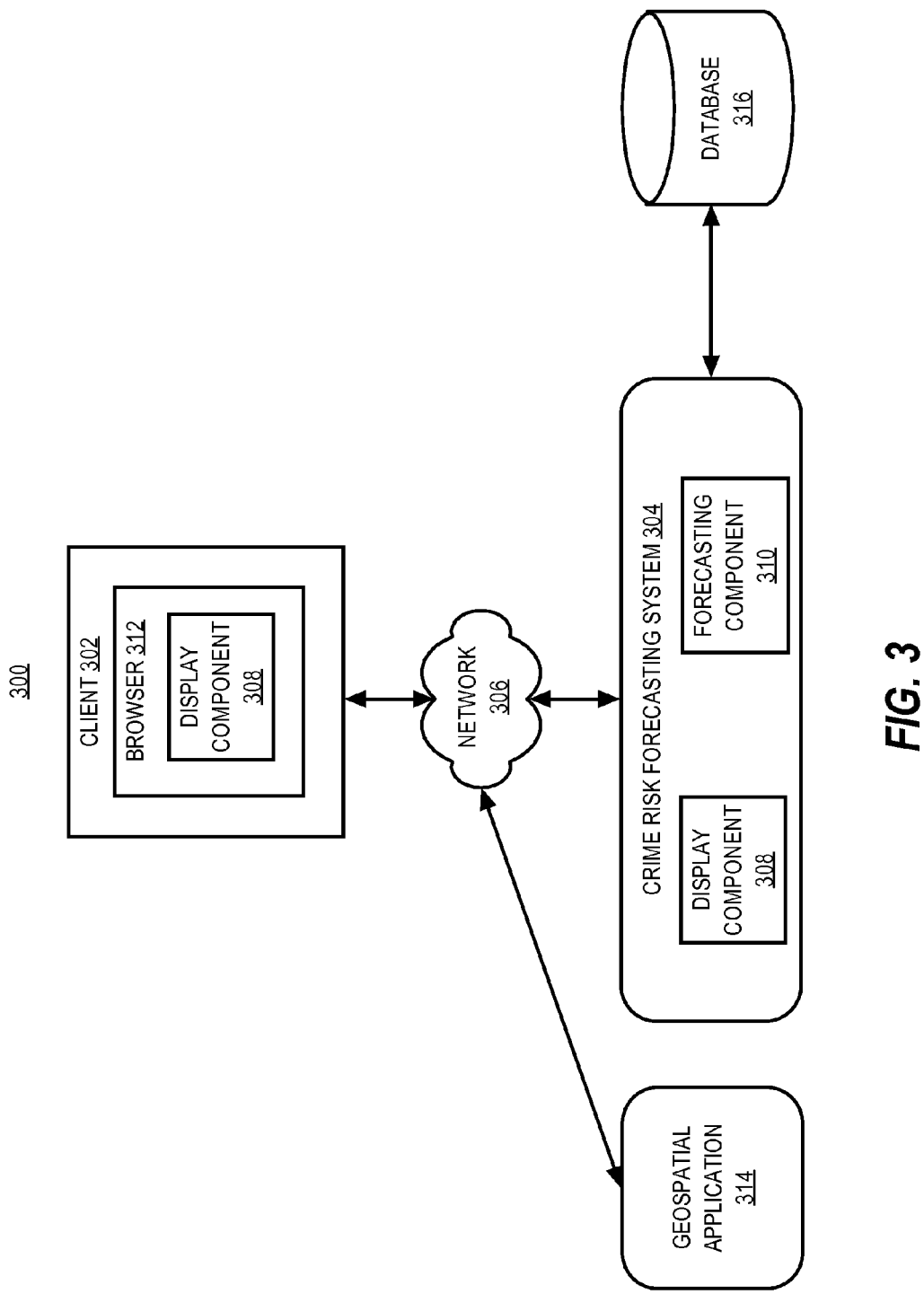
FIG. 3 is a block diagram of an example web-based geographic crime risk forecasting computer system in which an embodiment of the present invention is implemented.

FIG. 3 is a block diagram of an exemplary web-based geographic crime risk forecasting computer system 300. System 300 includes a client computing device 302 operatively coupled to crime risk forecasting system 304 by data network 306. The crime risk forecasting system 304 includes a display component 308 and a forecasting component 310.

Client computing device 302 executes a web browser 312. The web browser 312 may in turn execute a portion of display component 308.

Web browser 312 may be a conventional web browser offering a well-known web browser platform such as MICROSOFT INTERNET EXPLORER, MOZILLA FIREFOX, GOOGLE CHROME, and so forth.

The portion of display component 308 executed by web browser 312 may be implemented in standard client-side web application technologies such as HyperText Markup Language (HTML), Cascading Style Sheets (CSS), JavaScript (JS), and so forth.

The portion of display component 308 executed by web browser 312 may be delivered to client 302 for execution by web browser 312 over network 306 by the display component 308 of crime risk forecasting system 304. Such delivery may be made according to a standard Internet networking protocol such as the Transmission Control Protocol/Internet Protocol (IP), the HyperText Transfer Protocol (HTTP), and so forth.

The portion of display component 308 executed by web browser 312 is configured to retrieve over network 306 interactive geospatial basemaps from geospatial application 314 and visually overlay the retrieved basemaps with generated visual manifestations of crime risk forecasts generated by forecasting component 310. The forecasts generated by forecasting component 310 may also be sent to client 302 using standard Internet networking protocol(s). The basemaps with the forecast overlays are then presented in a window of the web browser 312 to a user of client 302.

Database 316 stores generated forecast information and information from which crime risk forecasts are generated such as region and grid cell geographic information, historical crime incident data, custody data, dispatch data, and so forth.

Geo spatial application 314 can be any geo spatial application capable of providing interactive geospatial basemaps such as those disclosed in related U.S. patent application Ser. No. 13/917,571, filed Jun. 13, 2013, entitled "Interactive Geo spatial Map", which is incorporated by reference herein in its entirety. Other possible geo spatial applications that could be used as geo spatial application 314 for providing interactive geo spatial basemaps include Internet map servers that support Web Map Service (WMS) standards developed by the Open Geospatial Consortium such as ESRI ARCGIS SERVER, GEOSERVER, ARCGIS.COM, GOOGLE MAPS API, MICROSOFT BING MAPS, and so forth.

Implementing Computing Device

Figure 4:
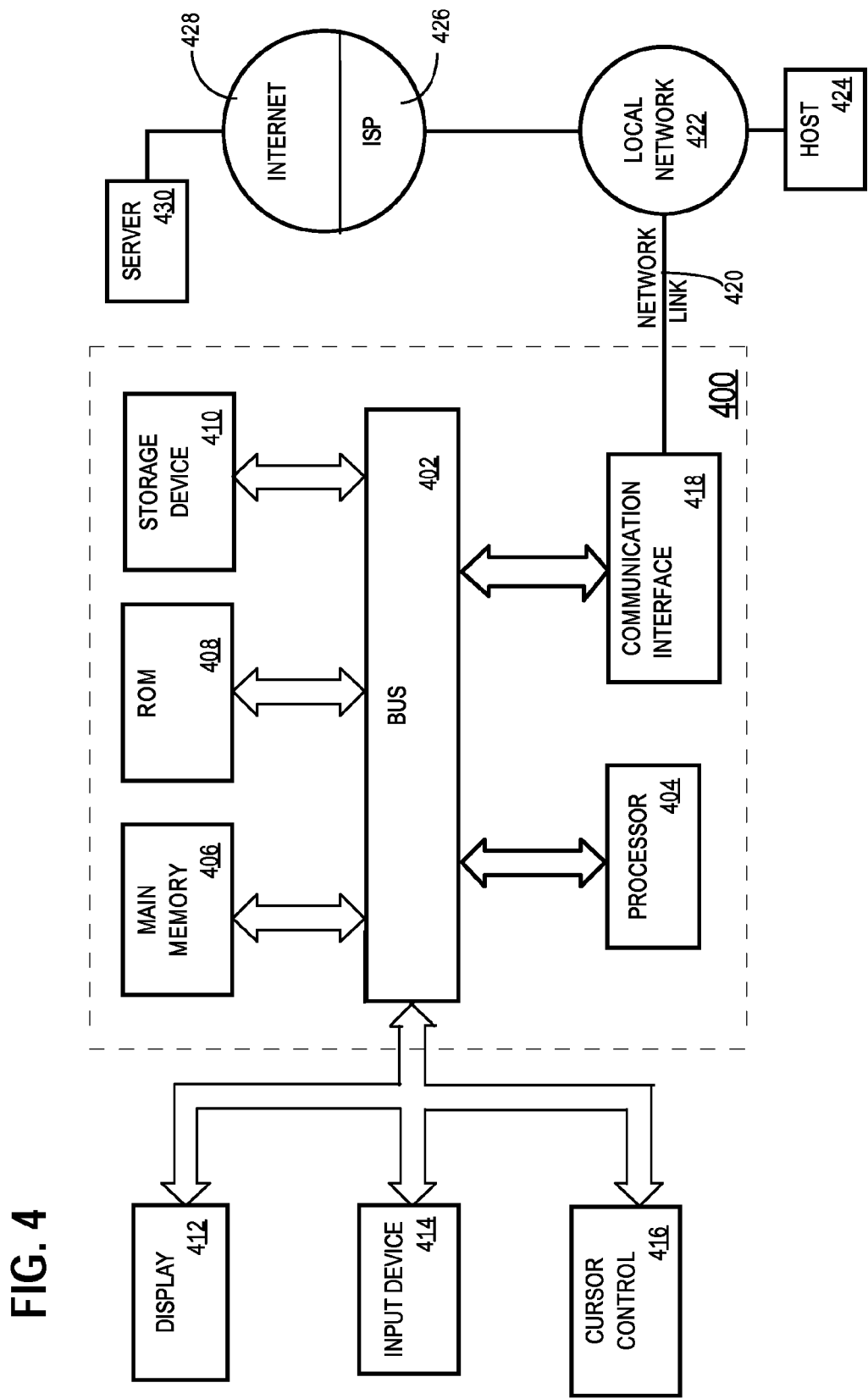
FIG. 4 is a block diagram that illustrates a computing device upon which embodiments of the present invention may be implemented.

In some embodiments, the techniques disclosed herein are implemented on one or more computing devices. For example, FIG. 4 is a block diagram that illustrates a computing device 400 in which some embodiments of the present invention may be embodied. Computing device 400 includes a bus 402 or other communication mechanism for communicating information, and a hardware processor 404 coupled with bus 402 for processing information. Hardware processor 404 may be, for example, a general purpose microprocessor or a system on a chip (SoC).

Computing device 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computing device 400 into a special-purpose machine that is customized to perform the operations specified in the instructions.

Computing device 400 further includes a read only memory (ROM) 408 or other static storage device coupled to bus 402 for storing static information and instructions for processor 404.

A storage device 410, such as a magnetic disk, optical disk, or solid-state drive is provided and coupled to bus 402 for storing information and instructions.

Computing device 400 may be coupled via bus 402 to a display 412, such as a liquid crystal display (LCD) or other electronic visual display, for displaying information to a computer user. Display 412 may also be a touch-sensitive display for communicating touch gesture (e.g., finger or stylus) input to processor 404.

An input device 414, including alphanumeric and other keys, is coupled to bus 402 for communicating information and command selections to processor 404.

Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computing device 400 may implement the techniques described herein using customized hard-wired logic, one or more application-specific integrated circuits (ASICs), one or more field-programmable gate arrays (FPGAs), firmware, or program logic which, in combination with the computing device, causes or programs computing device 400 to be a special-purpose machine. According to some embodiments, the techniques herein are performed by computing device 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computing device 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computing device 400, are example forms of transmission media.

Computing device 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

A software system is typically provided for controlling the operation of computing device 400. The software system, which is usually stored in main memory 406 and on fixed storage (e.g., hard disk) 410, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 400. The application(s) may be "loaded" into main memory 406 from storage 410 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computing device in accordance with instructions from the OS and/or application(s). The graphical user interface also serves to display the results of operation from the OS and application(s).

Extensions and Alternatives

The foregoing description, for purpose of explanation, has been described with reference to specific embodiments. However, the illustrative discussions above are not intended to be exhaustive or to limit the invention to the precise forms described. Many modifications and variations are possible in view of the above teachings. The embodiments were chosen and described in order to best explain the principles of the invention and its practical applications, to thereby enable other skilled in the art to best utilize the invention and various embodiments with various modifications as are suited to the particular use contemplated.

The invention claimed is:
1. A computer system comprising:
a database storing historical crime incident data reflecting crime incidents that occurred over a past period of time;
one or more computer readable media storing one or more software modules comprising computer executable instructions;
one or more hardware processors in communication with the one or more computer readable media, and configured to execute a forecasting module of the software modules in order to generate a crime risk forecast based at least on the historical crime incident data stored in the database, the generated crime risk forecast being for a particular target geographic area, a particular future time window, and a particular crime type;
the one or more hardware processors further configured to execute the forecasting module in order to generate a crime risk rating as part of generating the crime risk forecast;
the one or more hardware processors further configured to execute a presentation module of the software modules in order to generate and display a graphical user interface overlay on an interactive geospatial basemap generated by a geospatial application, the overlay visually indicating the particular target geographic area of the generated crime risk forecast on the interactive geospatial basemap, the overlay visually indicating the particular future time window of the generated crime risk forecast, and the overlay visually indicating the particular crime type of the generated crime risk forecast;
the one or more hardware processors further configured to execute the presentation module in order to generate and display, as part of the overlay, a visual indication of the generated crime risk rating;
wherein the particular future time window corresponds to a particular future law enforcement patrol shift, the particular future law enforcement patrol shift corresponding periodically recurring continuous period of time;
wherein the overlay visually indicates the particular future law enforcement patrol shift;
wherein the overlay further visually indicates, for each of a plurality of periodically recurring continuous sub-time periods of the periodically recurring continuous period of time, a number of the historical crime incidents that occurred during the each periodically recurring continuous sub-time period and in the particular target geographic area.

2. The system of claim 1, the one or more hardware processors further configured to execute the forecasting module in order to generate a crime risk rating as part of generating the crime risk forecast; and the one or more hardware processors further configured to execute the presentation module in order to generate, as part of the overlay, an indication of the generated crime risk rating of the generated crime risk forecast.

3. The system of claim 1, wherein the interactive basemap generated by the geospatial application comprises one or more features or objects.

4. The system of claim 3, wherein the features or objects comprise vector data.

5. The system of claim 3, wherein the features or objects comprise at least one of roads, terrain, lakes, rivers, vegetation, utilities, street lights, railroads, hotels or motels, schools, hospitals, buildings or structures, regions, transportation objects, entities, events, or documents.

6. The system of claim 1, the one or more hardware processors further configured to execute the forecasting module in order to generate the crime risk forecast based at least on machine learning that take features extracted from historical crime incident data stored in the database into account.

7. The system of claim 6, the one or more hardware processors further configured to execute the forecasting module in order to extract the features using a non-linear transformation in time and space of historical crime incident data stored in the database.

8. The system of claim 6, the one or more hardware processors further configured to execute the forecasting module in order to extract the features using a spatiotemporal cuboid in which historical crime incidents are projected onto a space-time cuboid and the features are built from the cuboid for each cell of the cuboid on each date in a date set.

9. The system of claim 6, the one or more hardware processors further configured to execute the forecasting module in order to extract the features using seasonal decomposition.

10. The system of claim 1, one or more hardware processors in communication with the one or more computer readable media, and configured to execute a forecasting module of the software modules in order to:
generate, based at least on a plurality of different criminological algorithms, a plurality of crime risk forecasts based at least on historical crime incident data stored in the database, wherein each generated crime risk forecast of the plurality of crime risk forecasts comprises a geographic target area of the forecast, a time window of the forecast, and a crime type;
provide as input to a machine learning algorithm a) the plurality of crime risk forecasts and b) actual crime incident data for the geographic target areas and the time windows of the plurality of crime risk forecasts;
assign, based at least on output of the machine learning algorithm, a weight to each of the plurality of different criminological algorithms; and
generate the crime risk forecast based at least on the plurality of different criminological algorithms and the assigned weights.

11. A computer system comprising:
a database storing historical crime incident data reflecting crime incidents that occurred over a past period of time;
one or more computer readable media storing one or more software modules comprising computer executable instructions;
one or more hardware processors in communication with the one or more computer readable media, and configured to execute a forecasting module of the software modules in order to:
generate, based at least on a plurality of different criminological algorithms, a plurality of crime risk forecasts based at least in part on the historical crime incident data in the database, wherein each generated crime risk forecast of the plurality of crime risk forecasts comprises a geographic target area of the forecast, a time window of the forecast, and a crime type;
provide as input to a machine learning algorithm a) the plurality of crime risk forecasts and b) actual crime incident data for the geographic target areas and the time windows of the plurality of crime risk forecasts;
assign, based at least on output of the machine learning algorithm, a weight to each of the plurality of different criminological algorithms;
generate a crime risk forecast based at least on the plurality of different criminological algorithms and the assigned weights, the generated crime risk forecast being for a particular target geographic area, a particular future time window, and a particular crime type; and
generate a crime risk rating as part of generating the crime risk forecast;
the one or more hardware processors further configured to execute a presentation module of the software modules in order to generate and display a graphical user interface overlay on an interactive geospatial basemap generated by a geospatial application, the overlay visually indicating the particular target geographic area of the generated crime risk forecast on the interactive geospatial basemap, the overlay visually indicating the particular future time window of the generated crime risk forecast, and the overlay visually indicating the particular crime type of the generated crime risk forecast;
the one or more hardware processors further configured to execute the presentation module in order to generate and display, as part of the overlay, a visual indication of the generated crime risk rating;
wherein the particular future time window corresponds to a particular future law enforcement patrol shift, the particular future law enforcement patrol shift corresponding to a periodically recurring continuous period of time;
wherein the overlay visually indicates the particular future law enforcement patrol shift;
wherein the overlay further visually indicates, for each of a plurality of periodically recurring continuous sub-time periods of the periodically recurring continuous period of time, a number of the historical crime incidents that occurred during the each periodically recurring continuous sub-time period and in the particular target geographic area.

12. The system of claim 11, the one or more hardware processors further configured to execute the forecasting module in order to generate a crime risk rating as part of generating the crime risk forecast; and the one or more hardware processors further configured to execute the presentation module in order to generate, as part of the overlay, an indication of the generated crime risk rating of the generated crime risk forecast.

13. The system of claim 11, wherein the interactive basemap generated by the geospatial application comprises one or more features or objects.

14. The system of claim 13, wherein the features or objects comprise vector data.

15. The system of claim 13, wherein the features or objects comprise at least one of roads, terrain, lakes, rivers, vegetation, utilities, street lights, railroads, hotels or motels, schools, hospitals, buildings or structures, regions, transportation objects, entities, events, or documents.

16. The system of claim 11, the one or more hardware processors further configured to execute the forecasting module in order to generate the crime risk forecast based at least on machine learning that take features extracted from historical crime incident data stored in the database into account.

17. The system of claim 16, the one or more hardware processors further configured to execute the forecasting module in order to extract the features using a non-linear transformation in time and space of historical crime incident data stored in the database.

18. The system of claim 16, the one or more hardware processors further configured to execute the forecasting module in order to extract the features using a spatiotemporal cuboid in which historical crime incidents are projected onto a space-time cuboid and the features are built from the cuboid for each cell of the cuboid on each date in a date set.

19. The system of claim 16, the one or more hardware processors further configured to execute the forecasting module in order to extract the features using seasonal decomposition.

20. A computer-implemented method comprising:
a forecasting module generating, via at least one hardware processor, based at least on a plurality of different criminological algorithms, a plurality of crime risk forecasts based at least in part on historical crime incident data in the database reflecting crime incidents that occurred over a past period of time, wherein each generated crime risk forecast of the plurality of crime risk forecasts comprises a geographic target area of the forecast, a time window of the forecast, and a crime type;
the forecasting module, via at least one hardware processor, providing as input to a machine learning algorithm a) the plurality of crime risk forecasts and b) actual crime incident data for the geographic target areas and the time windows of the plurality of crime risk forecasts;
the forecasting module assigning, via at least one hardware processor, based at least on output of the machine learning algorithm, a weight to each of the plurality of different criminological algorithms; and
the forecasting module generating, via at least one hardware processor, a crime risk forecast based at least on the plurality of different criminological algorithms and the assigned weights, the generated crime risk forecast being for a particular target geographic area, a particular future time window, and a particular crime type;
the forecasting module generating, via at least one hardware processor, a crime risk rating as part of generating the crime risk forecast;
a presentation module generating and displaying, via at least one hardware processor, a graphical user interface overlay on an interactive geospatial basemap generated by a geo spatial application, the overlay visually indicating the particular target geographic area of the generated crime risk forecast on the interactive geospatial basemap, the overlay visually indicating the particular future time window of the generated crime risk forecast, and the overlay visually indicating the particular crime type of the generated crime risk forecast; and
the presentation module generating and displaying, via at least one hardware processor, as part of the overlay, a visual indication of the generated crime risk rating;
wherein the particular future time window corresponds to a particular future law enforcement patrol shift, the particular future law enforcement patrol shift corresponding to a periodically recurring continuous period of time;
wherein the overlay visually indicates the particular future law enforcement patrol shift;
wherein the overlay further visually indicates, for each of a plurality of periodically recurring continuous sub-time periods of the periodically recurring continuous period of time, a number of the historical crime incidents that occurred during the each periodically recurring continuous sub-time period and in the particular target geographic area.

* * * * *